US010269392B2

(12) United States Patent
Lacroix et al.

(10) Patent No.: US 10,269,392 B2
(45) Date of Patent: Apr. 23, 2019

(54) AUTOMATED HAPTIC EFFECT ACCOMPANIMENT

(71) Applicant: Immersion Corporation, San Jose, CA (US)

(72) Inventors: Robert A. Lacroix, Saint-Lambert (CA); Paul Norris, San Francisco, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/619,590

(22) Filed: Feb. 11, 2015

(65) Prior Publication Data

US 2016/0232943 A1 Aug. 11, 2016

(51) Int. Cl.
*G11B 27/32* (2006.01)
*G06F 17/30* (2006.01)
*G06F 3/01* (2006.01)

(52) U.S. Cl.
CPC ............ *G11B 27/322* (2013.01); *G06F 3/016* (2013.01); *G06F 17/3074* (2013.01); *G06F 17/30781* (2013.01)

(58) Field of Classification Search
USPC .................................................. 386/239–262
See application file for complete search history.

(56) References Cited

U.S. PATENT DOCUMENTS

| 7,865,368 | B2 | 1/2011 | Li-Chun Wang et al. |
| 8,442,325 | B2 | 5/2013 | Hong et al. |
| 8,754,757 | B1* | 6/2014 | Ullrich .................... G06F 3/016 340/407.1 |
| 9,367,136 | B2 | 6/2016 | Latta et al. |
| 9,370,459 | B2 | 6/2016 | Mahoney |
| 9,370,704 | B2 | 6/2016 | Marty |
| 9,392,094 | B2 | 7/2016 | Hunt et al. |
| 9,462,262 | B1 | 10/2016 | Worley, III et al. |
| 9,626,805 | B2 | 4/2017 | Lampotang et al. |
| 9,645,646 | B2 | 5/2017 | Cowley et al. |
| 9,652,037 | B2 | 5/2017 | Rubin et al. |
| 9,760,166 | B2 | 9/2017 | Ammi et al. |
| 9,811,854 | B2 | 11/2017 | Lucido |
| 9,851,799 | B2 | 12/2017 | Keller et al. |
| 9,933,851 | B2 | 4/2018 | Goslin et al. |
| 9,948,885 | B2 | 4/2018 | Kurzweil |
| 2008/0297654 | A1* | 12/2008 | Verberkt ............... G06T 1/0021 348/500 |
| 2009/0096632 | A1* | 4/2009 | Ullrich ................. H04N 9/8205 340/4.21 |

(Continued)

FOREIGN PATENT DOCUMENTS

EP 2 136 286 A2 12/2009
EP 2 775 377 A2 9/2014

*Primary Examiner* — Hung Q Dang
(74) *Attorney, Agent, or Firm* — Miles & Stockbridge P.C.

(57) ABSTRACT

A method of playing media on a device includes initiating the playing of audio/video ("A/V") media on the device, and then identifying the A/V media. The method further includes selecting a pre-defined haptic track that corresponds to the identified A/V media, and playing the selected pre-defined haptic track in synchrony with the playing of the A/V, where the playing of the selected pre-defined haptic track generates haptic effects on the device.

24 Claims, 3 Drawing Sheets

(56) References Cited

U.S. PATENT DOCUMENTS

| | | | |
|---|---|---|---|
| 2009/0231276 A1* | 9/2009 | Ullrich | G06F 3/016 345/157 |
| 2011/0102160 A1 | 5/2011 | Heubel et al. | |
| 2011/0188832 A1* | 8/2011 | Choi | H04N 21/235 386/239 |
| 2013/0106691 A1 | 5/2013 | Rank | |
| 2013/0198625 A1* | 8/2013 | Anderson | G06F 3/016 715/701 |
| 2013/0227410 A1* | 8/2013 | Sridhara | H04N 21/235 715/702 |
| 2014/0093221 A1* | 4/2014 | Wikander | H04N 9/8205 386/248 |
| 2014/0176415 A1* | 6/2014 | Buuck | G06F 3/016 345/156 |
| 2014/0270681 A1* | 9/2014 | Sen | G11B 31/00 386/201 |
| 2016/0070348 A1 | 3/2016 | Cowley et al. | |
| 2016/0080682 A1* | 3/2016 | Diaz | H04N 5/765 386/227 |
| 2016/0084605 A1 | 3/2016 | Monti | |
| 2016/0086457 A1 | 3/2016 | Baron et al. | |
| 2016/0163227 A1 | 6/2016 | Penake et al. | |
| 2016/0166930 A1 | 6/2016 | Brav et al. | |
| 2016/0169635 A1 | 6/2016 | Hannigan et al. | |
| 2016/0170508 A1 | 6/2016 | Moore et al. | |
| 2016/0171860 A1 | 6/2016 | Hannigan et al. | |
| 2016/0171908 A1 | 6/2016 | Moore et al. | |
| 2016/0187969 A1 | 6/2016 | Larsen et al. | |
| 2016/0187974 A1 | 6/2016 | Mallinson | |
| 2016/0201888 A1 | 7/2016 | Ackley et al. | |
| 2016/0209658 A1 | 7/2016 | Zalewski | |
| 2016/0214015 A1 | 7/2016 | Osman et al. | |
| 2016/0214016 A1 | 7/2016 | Stafford | |
| 2016/0375170 A1 | 12/2016 | Kursula et al. | |
| 2017/0102771 A1 | 4/2017 | Lei | |
| 2017/0103574 A1 | 4/2017 | Faaborg et al. | |
| 2017/0131775 A1 | 5/2017 | Clements | |
| 2017/0148281 A1 | 5/2017 | Do et al. | |
| 2017/0154505 A1 | 6/2017 | Kim | |
| 2017/0168576 A1 | 6/2017 | Keller et al. | |
| 2017/0168773 A1 | 6/2017 | Keller et al. | |
| 2017/0178407 A1 | 6/2017 | Gaidar et al. | |
| 2017/0203221 A1 | 7/2017 | Goslin et al. | |
| 2017/0203225 A1 | 7/2017 | Goslin | |
| 2017/0206709 A1 | 7/2017 | Goslin et al. | |
| 2017/0214782 A1 | 7/2017 | Brinda | |
| 2017/0257270 A1 | 9/2017 | Goslin et al. | |
| 2017/0352185 A1 | 12/2017 | Bonilla Acevedo et al. | |
| 2018/0050267 A1 | 2/2018 | Jones | |
| 2018/0053351 A1 | 2/2018 | Anderson | |
| 2018/0077976 A1 | 3/2018 | Keller et al. | |
| 2018/0081436 A1 | 3/2018 | Keller et al. | |
| 2018/0093181 A1 | 4/2018 | Goslin et al. | |
| 2018/0107277 A1 | 4/2018 | Keller et al. | |
| 2018/0120936 A1 | 5/2018 | Keller et al. | |

* cited by examiner

AUTOMATED HAPTIC EFFECT ACCOMPANIMENT

FIELD

One embodiment is directed generally to haptic effects, and in particular to automated accompaniment of haptic effects to audio and/or video.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

An increasing number of devices, such as smartphones and tablets, include hardware, such as actuators, for generating haptic effects. Haptic effects, in particular, can enhance the viewing of audio and/or audio/video on these devices. For example, haptic effect accompaniment to an audio/video track can allow a viewer to "feel" an engine roaring in a car, explosions, collisions, and the shimmering feeling of sunlight.

SUMMARY

One embodiment is a method of playing media on a device. The method includes initiating the playing of audio/video ("A/V") media on the device, and then identifying the A/V media. The method further includes selecting a pre-defined haptic track that corresponds to the identified A/V media, and playing the selected pre-defined haptic track in synchrony with the playing of the A/V, where the playing of the selected pre-defined haptic track generates haptic effects on the device.

DETAILED DESCRIPTION

Embodiments allow for the automatic recognition and identification of an audio/video track that is playing or that may be played on a device. Based on the identification, a corresponding haptic effect track is selected and retrieved, and then played on a haptic output device during the playing of the audio/video track. As a result, the audio/video playback is automatically enhanced with haptic effects.

Figure 1:
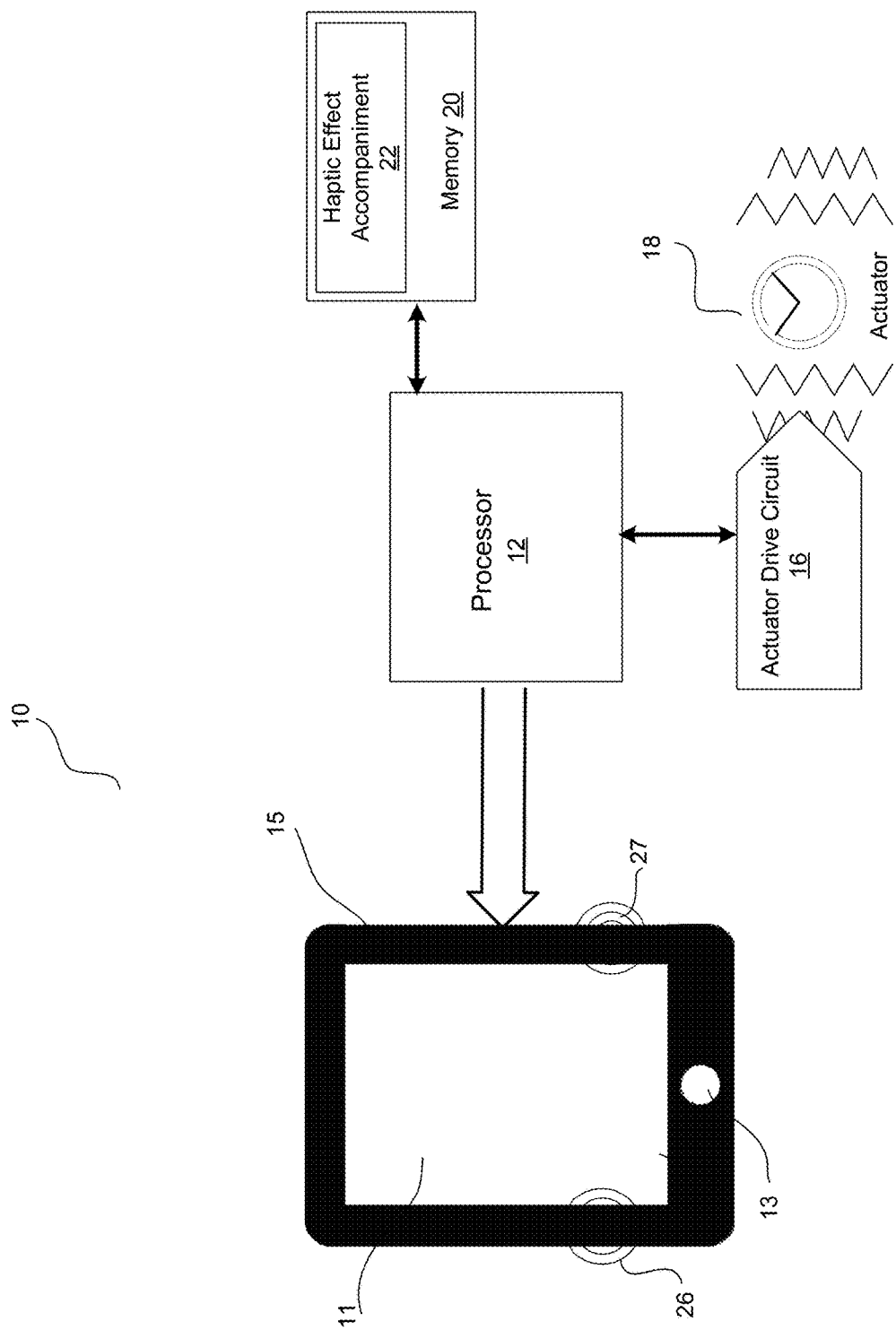
FIG. 1 is a block diagram of a haptically-enabled system/device in accordance with one embodiment of the present invention.

FIG. 1 is a block diagram of a haptically-enabled system/device 10 in accordance with one embodiment of the present invention. System 10 includes a touch sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and an actuator drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 26, 27, or other types of haptic effects on system 10.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12.

Memory 20 can be any type of storage device or computer-readable medium, such as random access memory ("RAM") or read-only memory ("ROM"). Memory 20 stores instructions executed by processor 12. Among the instructions, memory 20 includes haptic effect accompaniment module 22, which are instructions that, when executed by processor 12, automatically selects and generates haptic effects that accompany audio or audio/video media, as disclosed in more detail below. Memory 20 may also be located internal to processor 12, or any combination of internal and external memory.

System 10 may be any type of handheld/mobile device, such as a cellular telephone, personal digital assistant ("PDA"), smartphone, computer tablet, gaming console, remote control, or any other type of device that includes a haptic effect system that includes one or more actuators or any other type of haptic output device. System 10 further includes an audio/visual system (not shown) that is capable of playing video (with audio) or audio only. System 10 may be a wearable device such as wrist bands, headbands, eyeglasses, rings, leg bands, arrays integrated into clothing, etc., or any other type of device that a user may wear on a body or can be held by a user and that is haptically enabled, including furniture, a game controller, or a vehicle steering wheel. Further, some of the elements or functionality of system 10 may be remotely located or may be implemented by another device that is in communication with the remaining elements of system 10.

In addition to, or in place of, actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

Figure 2:
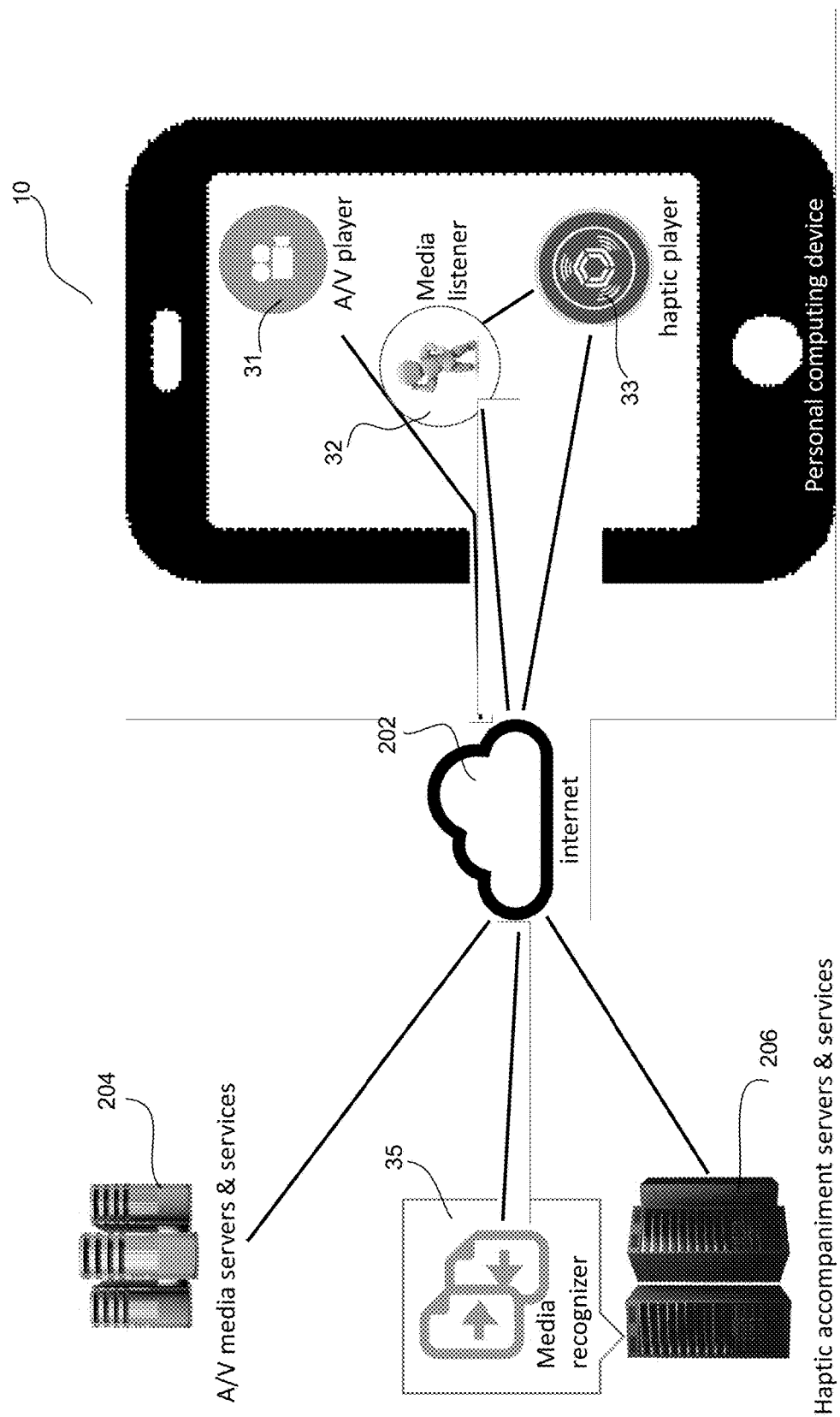
FIG. 2 is an overview diagram that includes the system of FIG. 1 and other network elements in accordance with one embodiment of the invention.

FIG. 2 is an overview diagram that includes system 10 of FIG. 1 and other network elements in accordance with one embodiment of the invention. System 10 is coupled to audio/visual ("A/V") media servers 204, and haptic accompaniment servers 206 through the internet 202, or through any other communications method. Further, media servers 204 and haptic servers 206 can be local to system 10, or the functionality of servers 204 and 206 can be provided by system 10 itself. Associated with haptic accompaniment servers 206 is a media recognizer 35. Media recognizer 35 "observes" A/V media playback or other A/V media characteristics and uniquely identifies the A/V media, and in conjunction with media listener 32 described below, finds/selects/determines a haptic effect media/track that corresponds to the identified media.

System 10, as shown in the embodiment of FIG. 2, includes an A/V player 31, a media listener 32, and a haptic player 33. A/V player 31 plays audio and/or video media on system 10. Haptic player 33 plays haptic effects on system 10, and includes actuator drive circuit 16 and actuator 18 of FIG. 1, or any type of haptic output device in other embodiments. Media listener 32 communicates with or otherwise uses media recognizer 35 and provides by itself or in conjunction with media recognizer 35 the automatic generation of the file association between haptic media and A/V media. In contrast, prior art solutions require an explicit association element in the system, such as metadata, that explicitly tells a playback system where a corresponding haptic track is located.

In general, media listener 32 functions as a "matchmaker" by automatically matching pre-existing or pre-defined haptic tracks to A/V media using some type of A/V recognition data. Media recognizer 35 can receive the A/V recognition data and in turn generate an identity of the A/V media. In one embodiment, the input to media recognizer 35 that functions as the A/V recognition data is the content of the A/V media itself, which can be some combination of audio and video, or video only, or audio only, and is used to uniquely identify the A/V media. The audio and video input in this embodiment is original content in that it has not been modified to assist in recognition haptic matching, such as by the addition of metadata.

In another embodiment, identifying information surrounding the A/V media, rather than the A/V media itself, is used to uniquely identify the A/V media by media recognizer 35 and functions as A/V recognition data. The identifying information can include, for example, a file name, a uniform resource locator ("URL), MPEG-4 metadata, etc. As with the above, the A/V media and the identifying information in one embodiment has not been modified to assist in recognition for haptic matching.

In another embodiment, the A/V media is re-encoded, or transcoded to inject human-perceptible or non-human-perceptible audio and/or video watermarks or signatures into the A/V media in order to assist in recognition for haptic matching and functions as the A/V recognition data. Therefore, the media is slightly modified from its original state before being stored on a media server for later streaming or downloading.

In another embodiment, the A/V media is re-encoded, transcoded, or otherwise modified to inject metadata into the A/V media in order to assist in recognition for haptic matching and functions as the A/V recognition data. Therefore, the media is slightly modified from its original state before being stored on a media server for later streaming or downloading.

In one embodiment, during operation of system 10, media listener 32 monitors A/V recognition data as it is being passed to, or is being output from, a media player system such as media server 204. A/V media may be requested by a user of system 10 by, for example, selecting a YouTube video stored on media server 204 to be streamed via internet 202 and played by A/V player 31. Further, in one embodiment, media listener 32 may pre-process the A/V media in order to create the A/V recognition data.

In one embodiment, media listener 32 may continuously stream A/V recognition data to media recognizer 35, or it may have the ability to discriminate at what times it is necessary to transmit A/V recognition data. This will lead to the A/V recognition data being either a continuous stream of data, or an occasional discontinuous stream of data, or some discrete number of data packets.

Media recognizer 35 uses the A/V recognition data to attempt to match the data to an existing haptic media or haptic track, possibly among a large set of pre-defined haptic tracks stored on server 206. Media recognizer 35, upon finding a match, provides the location of the haptic track to media listener 32. The functionality of media recognizer 35 can be implemented by system 10 itself, or remote from system 10 as shown in FIG. 2.

In one embodiment, one or both of the media listener 32 and media recognizer 35 determine the current playback location of the A/V media and the corresponding haptic track. Media listener 32 instructs haptic player 33 of the location of the haptic track, and the current playback location of the A/V media.

One or both of media listener 32 and haptic player 33 render the haptic track according to the current playback location of the A/V media such as to ensure reasonable synchrony between the A/V media and the haptic media. The haptic track is rendered, in one embodiment, by sending the corresponding haptic effect signal to actuator drive circuit 16, which causes actuator 18 to generate a vibratory haptic effect. The haptic track can start upon initiation of the playing of the A/V media, or at some point prior to or after initiation.

The elements shown in FIG. 2 can be implemented in many different configurations. In one embodiment, system 10 can be a mobile device with a haptic output system via haptic player 33, as well as A/V media playback capabilities via A/V player 31, and media listener 32 may be a service running on the mobile device, such as an application/"app". Media listener 32 communicates the A/V recognition data through internet 202, wired or wirelessly, to server 206 that is running a process that instantiates media recognizer 35, and to the same, or a different server 204, that hosts one or more haptic media that are associated with specific A/V media.

In another embodiment, system 10 can be a set-top box with a remote control unit that is equipped with a haptic output system that could be in the form of a gamepad, where the set-top box has the ability to transport A/V media to audio and video data sinks (e.g., a television and an audio sound system). In this embodiment, media listener 32 is a service running on the set-top box, and communicates with servers 204 and 206 over internet 202. In another embodiment, the set-top box is a gaming console.

In another embodiment, the set-top box hosts both media listener 32 and media recognizer 35, and the haptic media is accessible locally on the set-top box (e.g., in volatile memory, non-volatile memory, or physical disk), or the haptic media is accessible remotely by residing on media server 204 that is accessible via internet 202.

In another embodiment, the A/V content is rendered through a web browser on a device (e.g., Smart TV, mobile device, set-top box, etc.) or directly on the device, and media listener 32 can access the A/V recognition data through known software/hardware methods.

Figure 3:
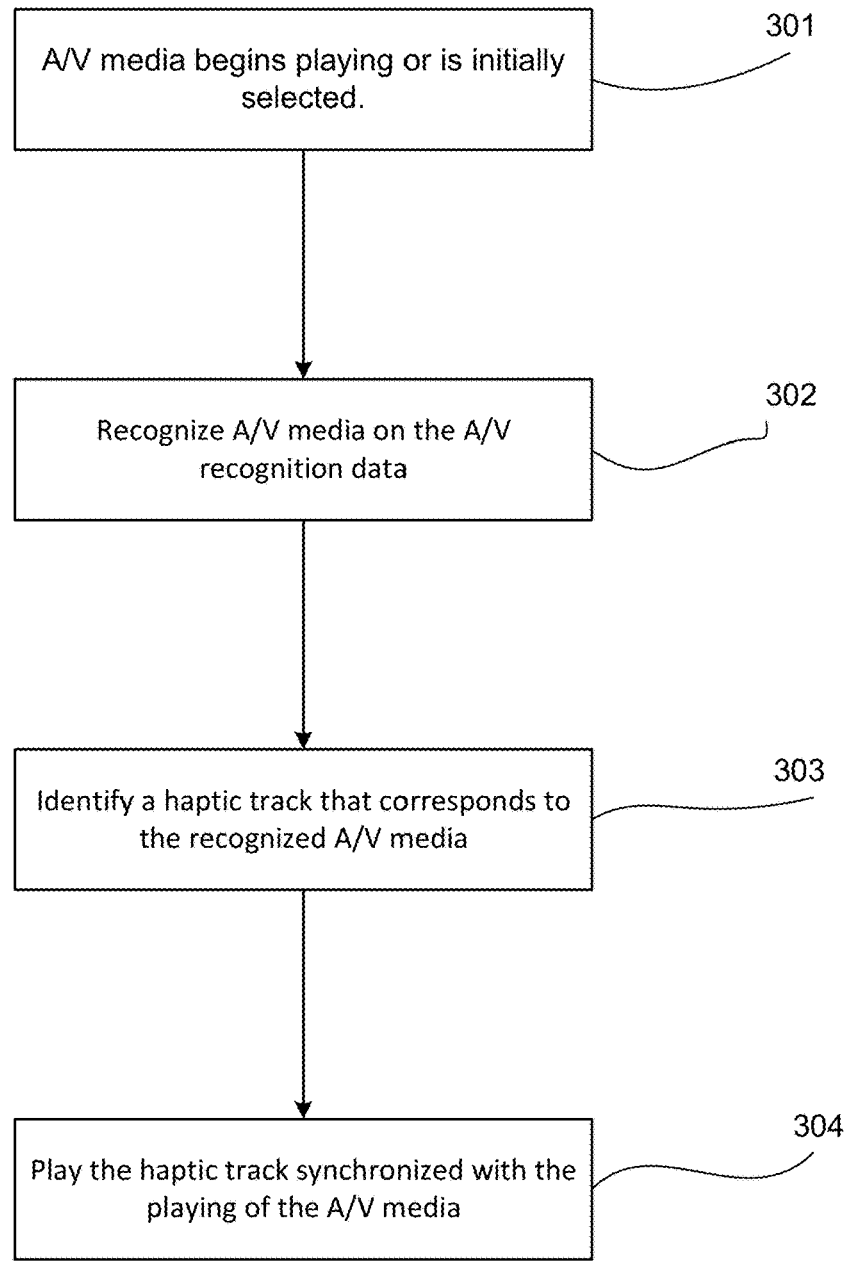
FIG. 3 is a flow diagram of the functionality of the system of FIG. 1 in accordance with an embodiment of the invention.

FIG. 3 is a flow diagram of the functionality of system 10 of FIG. 1 in accordance with an embodiment of the invention. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 301, A/V media (which includes audio and video, only audio, or only video media) begins playing or is initially selected. The A/V media includes A/V recognition data, which can include the A/V media itself.

At 302, the A/V media is recognized based on the A/V recognition data.

At 303, a haptic track that corresponds to the recognized A/V media is identified and retrieved/selected. The haptic track would include a haptic effect signal that when applied to a haptic effect output device would generate haptic effects.

At 304, the haptic track is played on system 10 in synchronized fashion with the playing of the A/V media. As a result, the viewing of the A/V media is enhanced.

Although in the above embodiment, the A/V media is first recognized, and then a haptic track is retrieved/selected, in another embodiment the reverse may happen. In other words, in one embodiment a haptic track is initiated and identified, and then the system selects and plays back A/V media in a synchronized fashion.

In one embodiment, the selection of the haptic track at 303 can depend on the capabilities of the target device on which the haptic effect will be generated. For example, some devices are equipped with standard definition ("SD") actuators, such as LRAs, and other devices are equipped with high definition ("HD") actuators, such as piezo actuators. For a particular A/V media, there may be both a corresponding SD and HD haptic track. The selection of SD or HD will depend on the capabilities of the target device. Media listener 32 in one embodiment would have knowledge of the haptic effect playback capabilities of system 10.

As an example of a use of embodiments of the invention, assume a user has a smartphone that has the media listener service running. The user starts up the YouTube application, and proceeds to watch a kitten fight video for which someone has previously created a corresponding haptic track. The media listener sends processed (or unprocessed) data to a media recognizer, which can reside on the smartphone or an internet server. The recognizer finds a suitable haptic media for the kitten fight video. The media listener service starts retrieving the haptic media to play it back in synchrony with the kitten fight video, creating haptic sensations for every kitten swipe and knockdown.

As disclosed, embodiments observe A/V media playback, and in observing it, uniquely identify the media. Embodiments then find a corresponding haptic media, and then synchronize the haptic media playback to the A/V media playback on a personal computing device, or any other type of haptically enabled device.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of playing media on a user device, the method comprising:
   initiating playing of audio/video (A/V) media on the user device;
   identifying the A/V media playing on the user device to generate identified A/V media;
   generating, at the user device, A/V recognition data as the A/V media is playing on the user device by modifying the identified A/V media to include an A/N watermark used in recognition for haptic matching of the A/V media to a selected pre-defined haptic track, the selected pre-defined haptic track being received at the user device from a location remote from the user device;
   matching, at the user device, the selected pre-defined haptic track to the identified A/V media with the use of the A/V recognition data and without the use of metadata; and
   playing the selected pre-defined haptic track that corresponds to the identified A/V media in synchrony with the playing of the A/V media,
   wherein the playing of the selected pre-defined haptic track generates haptic effects on the user device.

2. The method of claim 1, wherein the identifying is based on a content of the A/V media.

3. The method of claim 1, wherein the A/V media comprises a file name, and the identifying is based on the file name.

4. The method of claim 1, wherein the selected pre-defined haptic track comprises a haptic signal comprising a plurality of haptic effect parameters.

5. The method of claim 1, wherein the A/V media is remote from the user device at a first location, and the selected pre-defined haptic track is remote from the user device at a second location that is different from the first location.

6. The method of claim 1, wherein the playing of the selected pre-defined haptic track comprises sending motor signals to an actuator.

7. The method of claim 1, wherein the identifying is based on the A/V recognition data.

8. The method of claim 1, wherein the selected pre-defined haptic track is selected based on a haptic output capability of the user device.

9. A non-transitory computer-readable medium having instructions stored thereon that, when executed by a processor, cause the processor to play media on a user device, the instructions comprising:
   initiating playing of audio/video (A/V) media on the user device;
   identifying the A/V media playing on the user device to generate identified A/V media;
   generating, at the user device, A/V recognition data as the A/V media is playing on the user device by modifying the identified A/V media to include an A/V watermark used in recognition for haptic matching of the A/V media to a selected pre-defined haptic track, the selected pre-defined haptic track being received at the user device from a location remote from the user device;

matching, at the user device, the selected pre-defined haptic track to the identified A/V media with the use of the A/V recognition data and without the use of metadata; and playing the selected pre-defined haptic track that corresponds to the identified A/V media in synchrony with the playing of the A/V media, wherein the playing of the selected pre-defined haptic track generates haptic effects on the user device.

10. The non-transitory computer-readable medium of claim 9, wherein the identifying is based on a content of the A/V media.

11. The non-transitory computer-readable medium of claim 9, wherein the A/V media comprises a file name, and the identifying is based on the file name.

12. The non-transitory computer-readable medium of claim 9, wherein the selected pre-defined haptic track comprises a haptic signal comprising a plurality of haptic effect parameters.

13. The non-transitory computer-readable medium of claim 9, wherein the A/V media is remote from the user device at a first location, and the selected pre-defined haptic track is remote from the user device at a second location that is different from the first location.

14. The non-transitory computer-readable medium of claim 9, wherein the playing of the selected pre-defined haptic track comprises sending motor signals to an actuator.

15. The non-transitory computer-readable medium of claim 9, wherein the A/V media is modified to include A/V recognition data comprising a watermark, the identifying being based on the A/V recognition data.

16. The non-transitory computer-readable medium of claim 9, wherein the selected pre-defined haptic track is selected based on a haptic output capability of the user device.

17. A haptically-enabled device, comprising:
a haptic player;
an audio/video (A/V) media player; and
a media listener;
wherein the haptic player, the A/V media player and the media listener are within a single housing,
wherein the media listener, based on A/V recognition data generated at the haptically-enabled device by modifying an identity of A/V media being played by the A/V media player to include an A/V watermark used in recognition for haptic matching of the A/V media to a selected pre-defined haptic track, matches the selected pre-defined haptic track to the A/V media without the use of metadata,
wherein the A/V recognition data is generated as the A/V media is being played by the A/V media player,
wherein the selected pre-defined haptic track is received at the haptically-enabled device from a location remote from the haptically-enabled device, and
wherein at least one of the haptic player and the media listener plays the selected pre-defined haptic track that corresponds to the identity of the A/V media.

18. The haptically-enabled device of claim 17, wherein the A/V media is identified based on the A/V recognition data.

19. The haptically-enabled device of claim 18, wherein the A/V recognition data comprises a content of the A/V media.

20. The haptically-enabled device of claim 18, wherein the A/V media comprises a file name, and the A/V recognition data comprises the file name.

21. The haptically-enabled device of claim 17, wherein the haptic player comprises an actuator.

22. A system configured to provide haptic effect accompaniment, the system comprising:
a device configured to be worn or held during use, the device being configured to provide audio and/or visual output with haptic effects; and
a media identification tool within the device, the media identification tool being configured to generate identified audio and/or visual media by identifying the audio and/or visual output as the audio and/or visual output is provided by the device;
wherein the haptic effects are in a selected pre-defined haptic track, the selected pre-defined haptic track being received at the device from a location remote from the device,
wherein the media identification tool further is configured to match the selected pre-defined haptic track, without the use of metadata, to the audio and/or visual output based on audio and/or visual recognition data,
wherein the audio and/or visual recognition data is generated by modifying an identity of the identified audio and/or visual media to include an audio and/or video watermark used in recognition for haptic matching of the audio and/or visual output, and
wherein the audio and/or visual recognition data is generated, at the device, as the audio and/or visual output is being provided by the device.

23. The system according to claim 22, wherein the device is further configured to provide at least one of the audio output, the visual output, and the haptic effects during use.

24. The system according to claim 22, wherein the media identification tool automatically matches haptic tracks to the audio and/or visual recognition data.

* * * * *